United States Patent [19]

Howard, Jr.

[11] Patent Number: 5,143,549
[45] Date of Patent: Sep. 1, 1992

[54] PREPARATION OF CATALYTICALLY ACTIVE FILLERS FOR POLYOLEFIN COMPOSITES

[75] Inventor: Edward G. Howard, Jr., Hockessin, Del.

[73] Assignee: E. I. Du Pont de Nemours and Company, Wilmington, Del.

[21] Appl. No.: 732,567

[22] Filed: Jul. 19, 1991

[51] Int. Cl.$^5$ ................................................ C09C 3/08
[52] U.S. Cl. .................................... 106/499; 106/400; 106/401; 106/901; 502/134
[58] Field of Search ................. 502/134; 106/400, 401, 106/499, 901

[56] References Cited

U.S. PATENT DOCUMENTS

| | | | |
|---|---|---|---|
| 3,979,504 | 9/1976 | Ziegenhain et al. | 423/628 |
| 4,097,447 | 6/1978 | Howard | 260/42.14 |
| 4,104,243 | 8/1978 | Howard | 260/42.14 |
| 4,126,647 | 11/1978 | Howard | 260/878 R |
| 4,151,126 | 4/1979 | Adelman et al. | 252/508 |
| 4,187,210 | 2/1980 | Howard | 260/42.14 |
| 4,780,438 | 10/1988 | Garoff et al. | 502/107 |
| 4,780,439 | 10/1988 | Garoff | 502/107 |
| 4,780,440 | 10/1988 | Garoff | 502/134 |

FOREIGN PATENT DOCUMENTS 1120402  7/1968  United Kingdom .

OTHER PUBLICATIONS

Kirk–Othmer Encyclopedia, p. 372.

Primary Examiner—William R. Dixon, Jr.
Assistant Examiner—Scott L. Hertzog

[57] ABSTRACT

This invention relates to polyolefin composites, and to processes for drying fillers and catalytically-active fillers for use in preparing homogeneous polyolefin composites.

30 Claims, No Drawings

PREPARATION OF CATALYTICALLY ACTIVE FILLERS FOR POLYOLEFIN COMPOSITES

BACKGROUND OF THE INVENTION

1. Field of the Invention

This invention relates to polyolefin composites, particularly to processes for drying fillers and catalytically-active fillers for use in preparing homogeneous polyolefin composites.

2. Technical Background

U.S. Pat. Nos. 4,187,210, 4,097,447, 4,126,647 and 4,104,243 to Howard, and U.S. Pat. No. 4,151,126 to Adelman & Howard, disclose composites of polyolefins, including ultrahigh molecular weight polyethylene, with a variety of finely divided particulate inorganic filler compounds, including alumina, calcium carbonate, kaolinite clay, mica and conductive carbon, and organic filler materials such as polyacrylonitrile, wherein the composites comprise at least about 25% by weight of filler. These patents, together with U.S. Pat. No. 4,104,243 (Howard), also disclose methods of preparing composites which permit relatively high loadings of filler without sacrifice of essential physical properties. In these processes, ethylene is polymerized on the surface of catalytically acitive filler particles. The resulting composites are substantially free of polymer-free filler and of filler-free polymer.

In the processes of the aforementioned patents, filler materials having neutral-to-acidic surfaces or chemically modified to have such surfaces, are dispersed in hydrocarbon solvents and rendered catalytically active by treatment with selected transition metal compounds. It is essential for the filler compounds to be "dry", that is, substantially free of water and other polar organic compounds such as alcohols which can interfere with the attachment of the transition metal catalysts to the filler surfaces and/or with the olefin polymerization step. Filler drying may be required with as-received filler materials, or after one or more of the various treatments described in the aforementioned patents, to provide adequate surface acidity and/or transition metal content.

In conventional drying procedures, including those practiced in the aforementioned patents, fillers are often heated for long periods (12-24 h) at temperatures of 100° to about 300° C. in a stream of inert gas such as nitrogen; typically a flow of about 20-800 liter/h is employed. Such drying normally requires special apparatus, separate from the equipment used for preparing catalytically active filler.

For commercial practice there is a need for conducting all steps in the preparation of catalytically active filler in situ, i.e., in the same vessel, and for eliminating the costly use of large volumes of gas during drying steps. Drying (water removal) of liquids and solids by azeotropic distillation employing various organic liquids is known.

U.S. Pat. Nos. 4,780,438 and 4,780,439 disclose a method of preparing a supported catalyst for polymerizing olefins wherein magnesium chloride support material is dissolved in ethanol and the ethanol solution is dried by azeotropic distillation of an ethanol/water mixture. The magnesium chloride is subsequently precipitated from ethanol solution and reacted with a titanium compound to form the supported catalyst.

Kirk-Othmer Encyclopedia discloses water removal from solids by adding an "entrainer" such as benzene or toluene and azeotropically distilling the water; azeotropic drying at lower temperatures is cited as a way to avoid chemical by-products.

U.S. Pat. No. 3,979,504 discloses a process for preparing a high-surface area alumina comprising drying an aqueous slurry of the alumina by admixture with an organic solvent and distilling a solvent/water azeotrope. The organic solvent should have a lower surface tension than water; $C_{2-4}$ alcohols are disclosed as suitable.

British Patent 1,120,402 discloses a method of drying ion-exchange desiccants by mixing the water-laden resin with an azeotrope-forming halogenated hydrocarbon and distilling a hydrocarbon/water azeotrope. The desired boiling range for the azeotrope at atmospheric pressure is given as 50°-165° C., preferably 85°-125° C.

The present invention provides an economical in-situ (one pot) process for preparing catalytically active fillers for olefin polymerization comprising dispersing the fillers, which may have been previously treated to acidify the filler surfaces, in a non-solvent liquid hydrocarbon and distilling a water-containing azeotrope.

SUMMARY OF THE INVENTION

The present invention discloses a process for the in-situ (one pot) preparation of a catalytically active olefin-polymerizing filler compound for polyoflefin composites comprising:

(a) drying a filler compound having a neutral-to-acidic surface by mixing said filler compound in a liquid alkane and distilling an azeotropic mixture comprising said alkane and water; and (b) attachment of an olefin-polymerizing transition metal compound to the dried filler compound from step (a).

Also disclosed is a process for the in-situ preparation of a catalytically active olefin-polymerizing filler compound for polyolefin composites comprising:

(a) surface acidification of a basic filler compound in the presence of a solution of an acidifying compound and an effective amount of a liquid alkane;

(b) attachment of an olefin-polymerizing transition metal compound to the filler from step (a); and (c) drying the catalytically active filler from step (b) by dispersing said filler compound in a liquid alkane and distilling an azeotropic mixture comprising said alkane and water.

Alternatively in the preceding process, step (c) may precede step (b).

This invention also discloses a process for preparing a homogeneous, particulate polyolefin composite which comprises:

(a) in-situ preparation of a catalytically active olefin-polymerizing filler compound according to any of the above processes; and (b) addition of one or more alpha olefins to the catalytically active filler compound from step (a) under olefin polymerization conditions in the presence of a co-catalyst comprising a trialkylaluminum compound.

DETAILED DESCRIPTION OF THE INVENTION

The foregoing patents to Howard et al., discussed herein under Technical Background, are incorporated herein by reference. These patents describe processes for preparing highly homogeneous particulate polyolefin/mineral composites. In these processes, powdered mineral fillers having neutral-to-acidic surfaces are dried to an appropriate degree and then reacted with a catalytically effective amount of a transition metal compound. The catalytically active filler compound is then reacted under coordination polymerization conditions with one or more alpha olefins, preferably ethylene, in the presence of a trialkyl aluminum co-catalyst to form the polyolefin/mineral composite wherein the polyolefin is chemically attached to the filler. The required degree of mineral drying depends on the initial moisture content of the mineral and on the transition metal compound to be used. For example, a small amount of residual water is beneficial when the transition metal compound is $Ti(Cl)_4$ as it assists in the conversion of said transition metal to the catalytically active hydroxylated form. However, even traces of water are deleterious when the transition metal compound is a tetraalkylzirconium such as tetraneophylzirconium. Conventional drying of mineral fillers for use in preparing polyolefin/mineral composites normally involves heating the mineral in a stream of inert gas such as nitrogen. Such drying requires separate facilities and large volumes of dry inert gas which must be vented or collected, redried and recycled. The present invention improves these processes by providing an economical method for in-situ drying of the filler.

In the present invention, mineral fillers having a neutral or acid surfaces are efficiently dried in-situ by mixing the mineral fillers with an effective amount of one or more liquid alkanes which are chemically inert under process conditions, said liquid alkane(s) forming a constant-boiling azeotropic mixture (azeotrope) with water, and distilling the azeotrope until the mineral is dry, i.e., until all water is removed. After drying, the filler can be reacted with an effective amount of a transition metal to catalytically activate the filler. The invention can also be used with mineral fillers having alkaline surfaces where these fillers have been pretreated, as described below, to render their surfaces neutral or acidic. The above mentioned Howard patents disclose the transition metals useful in the present reactions. The resulting catalytically active fillers are used to prepare homogeneous particulate polyolefin composites by contacting them with one or more alpha olefins under polymerizing conditions. Co-catalysts for the polymerization step are trialkylaluminum compounds. The preferred olefin is ethylene and the preferred co-catalyst is triisobutylaluminum.

By "an effective amount" of liquid alkane is meant a quantity at least sufficient to form an azeotropic mixture with all of the water present in the system.

Suitable azeotrope-forming alkanes include, but are not limited to, n-octane, n-heptane, cyclohexane and commercially available hydrocarbon mixtures such as Exxon Isopar ® H. Preferably the azeotropic mixture comprising the one or more liquid alkanes and water boils in the temperature range of about 60° to about 98° C., more preferably about 70° to 95° C., at atmospheric pressure.

Preferably the liquid alkane has a boiling point in the range of about 70° to about 190° C., more preferably about 90° to 170° C. at atmospheric pressure. Operation at elevated pressure is preferred with alkanes having boiling points, measured at atmospheric pressure, below about 80° C. Higher boiling alkanes are preferred because their azeotropes with water, which boil below the boiling point of pure water, have a higher water content than those of azeotropes of lower boiling alkanes. However, the boiling point of the alkane should not be too high because of the difficulty of removing excess alkane, from the filler or the polymer composite, after the azeotrope has been distilled off. Addition of a lower boiling alcohol such as isopropanol to the higher boiling alkane can aid in the removal of the latter by forming a lower boiling, easily distillable, alkane/alcohol azeotrope.

The foregoing patents to Howard et al. also describe the preparation of polyolefin/mineral composites which employ mineral fillers having alkaline surfaces, for example, calcium carbonate. Such surfaces, if untreated, would severely inhibit coordination polymerization of olefins. This inhibition can be overcome, prior to treatment with transition metal compound, by coating the mineral with at least about 0.01%, based on filler, of an acidic oxide such as silica, alumina, acid phosphate or sulfate, thereby effectively acidifying the mineral surface. The acidic coatings are usually applied by slurrying the mineral filler in a solution of the acidifying compound, e.g., phosphoric acid, sulfuric acid, silicon tetrachloride, or aluminum trichloride, sulfate or alkoxide.

Suitable solvents for the acidifying compound include water and $C_{2-4}$ alcohols such as isopropanol. Depending on the sensitivity to water or alcohol of the transition metal compound to be used in catalytically activating the filler, the acid-coated filler is dried either before or after addition of the transition metal compound.

The mineral-containing system is dried, i.e., freed from water and the solvent for the acidifying compound (if other than water) by adding an azeotrope-forming liquid alkane and distilling, as previously described, the one or more azeotropic mixtures so formed. It is often convenient to add the trialkylaluminum co-catalyst compound prior to adding the transition metal catalyst because it assists in the formation of a low viscosity dispersion of catalyst in the solvent system. However, the trialkylaluminum co-catalyst must not be added until azeotropic drying is complete. The process steps comprising filler surface acidification (where required), transition metal treatment and drying are carried out in-situ ("one pot" operation).

EXAMPLES

In the following examples of specific embodiments of the invention all parts and percentages are by weight, temperatures are in degrees Celcius and pressure is atmospheric unless otherwise specified.

Examples 1-4 relate to the azeotropic drying of minerals and their subsequent use in the preparation of polyolefin/mineral composites. Examples 5 and 6 relate to the in-situ acidification of basic mineral, catalyst formation, azeotropic drying of catalyst, and subsequent formation of polyethylene/mineral composites. In Example 6, physical properties are determined by the following ASTM test designations.

| Property | Test Specifications |
| --- | --- |
| Tensile Strength | ASTM D638-71A |
| Tensile Modulus | ASTM D638-71A |
| Elongation | ASTM D638-71A |
| Izod Impact Strength | ASTM D256-72A |

EXAMPLE 1

A round-bottom flask was fitted with a magnetic stirrer, thermocouple, water trap/condenser and nitrogen inlet tube and charged with 73 g of Englehard ASP 400 kaolin clay and 800 ml of n-octane (b.p. 125° C.). The stirred mixture was heated at reflux (90°) for 5 h while 100 ml of water and octane mixture was drawn from the trap. To the cooled mixture under nitrogen purge was added 11 mmoles of triisobutylaluminum which caused the formation of a dispersion having approximately the same viscosity as the octane. The mixture was pressuretransferred with nitrogen into a dry blender cup, which was also purged with nitrogen. The catalyst, tetraneophylzirconium (0.3 mmole) was added and the mixture was stirred vigorously and transferred by nitrogen pressure to a 1 l autoclave with a magnetically driven stirrer. Ethylene at 100 psi pressure was added and, after 61 min at 60° C., 27 g of ethylene was consumed by polymerization. The powdery polyethylene/clay composite product was collected by filtration, washed with acetone, and dried; wt 100 g. A film pressed at 160° C. was smooth, uniform and had no mineral agglomerates. Anal. Ash, 60.6%, equivalent to 69.5% clay.

EXAMPLE 2

Example 1 was repeated except that n-heptane (b.p.98.4° C.) was used in place of n-octane. The powdery polyethylene/clay composite (97 g) also gave a uniform film when hot-pressed and contained no mineral agglomerates.

EXAMPLE 3

Example 2 was repeated except that the clay mineral was replaced with phosphated $CaCO_3$ (70 g). During ethylene polymerization 25 g of ethylene were absorbed in 4 h. The product weighed 91.7 g. Anal.: Ash 72.9% $CaCO_3$.

EXAMPLE 4

Example 1 was repeated using Alcoa C-333B $Al_2O_3 \cdot 3H_2O$ in place of clay. During ethylene polymerization 25 g of ethylene were absorbed in 3.4 h. The polyethlene/alumina composite product caked when filtered but was easily powdered when chopped in a food blender. A hot pressed film was uniform and smooth. When the film was creased it developed some microtears but did not fail.

EXAMPLE 5

A 5-1, 4-necked flask fitted with a strong and rapid paddle stirrer, still head/condenser and dropping funnel, was charged with 1.5 l of Exxon Isopar® H hydrocarbon liquid and 250 g of calcium carbonate (Georgia Marble, Gamma Sperse 6461). The stirred mixture was heated to 105° C. and 25 g of 85% phosphoric acid ($H_3PO_4$, 15% $H_2O$) dissolved in 50 ml of isopropyl alcohol was added dropwise over a period of 10 min. Carbon dioxide was liberated. After gas evolution ceased, 1.6 ml of titanium tetrachloride dissolved in 50 ml of Isopar® H was added over a 20 min period. The phosphoric acid-coated mineral dispersion was freed of alcohol and water by distilling until 500 ml of Isopar® H, alcohol and water had been removed. After cooling under nitrogen purge, the mineral dispersion was transferred to a 1 gallon stirred autoclave containing 2 l of dry, oxygen-free Isopar® H and 25 mmoles of isobutylaluminum. Ethylene at 100 psi was added and 132 g of ethylene was absorbed in 2.7 h at 50° C. The product composite was isolated by filtration, washed with isopropyl alcohol, and air-dried. A small sample in methylene chloride completely sank; no polyethylene floated to the top, indicating that all polymer was attached to the mineral.

EXAMPLE 6

The procedure of Example 5 was followed using 300 g of calcium carbonate, 1.6 ml of $TiCl_4$ in 50 ml of Isopar® H, 25 mmoles of isobutylaluminum and, in place of the phosphoric acid, 20 g of concentrated sulfuric acid in 50 ml of isopropyl alcohol. Ethylene was polymerized at 50° C. under 100 psi ethylene pressure, 175 g of ethylene being absorbed in 4 h. The powdery polyethlene/mineral composite product (483 g) was isolated by filtration, washed with isopropyl alcohol and air-dried. A sample of the product, after compression molding at 3000 psi and 160° C., had the following properties:

| Tensile Properties | |
| --- | --- |
| Tensile Strength, yield, psi | 2054 |
| Tensile Strength, max., psi | 3341 |
| Tensile Strength, break, psi | 3339 |
| Elongation, yield, % | 3.3 |
| Elongation, break, % | 252 |
| Modulus, kpsi | 533.5 |
| Izod Impact, ft-lb/in of notch | 10.7 |

Although preferred embodiments have been described above, it is to be understood that there is no intention to limit the invention to the precise constructions herein disclosed, and it is to be further understood that the right is reserved to all changes coming within the scope of the invention as defined by the appended claims.

I claim:

1. A process for the in-situ preparation of a catalytically active olefin-polymerizing filler compound for polyoflefin composites comprising:
    (a) drying a filler compound having a neutral-to-acidic surface by mixing said filler compound in a liquid alkane and water and distilling an azeotropic mixture comprising said alkane and water; and
    (b) attaching an olefin-polymerizing transition metal compound to the dried filler compound from step (a) so as to make a catalytically active filler.

2. A process for the in-situ preparation of a catalytically active olefin-polymerizing filler compound for polyolefin composites comprising:
    (a) surface acidifying a basic filler compound in the presence of a solution of an acidifying compound and an effective amount of a liquid alkane;
    (b) attaching an olefin-polymerizing transition metal compound to the filler from step (a) so as to make a catalytically active filler; and
    (c) drying the filler from step (b) by distilling one or more azeotropic mixtures comprising alkane, water and solvent for said acidifying compound.

3. The process according to claim 2 wherein step (c) precedes step (b).

4. A process for preparing a homogeneous, particulate polyolefin composite which comprises:
    (a) in-situ preparation of a catalytically active olefin-polymerizing filler compound according to claim 1; and (b) adding one or more alpha olefins to the catalytically active filler compound from step (a), under olefin polymerization conditions, in the presence of a co-catalyst comprising a trialkylaluminum compound.

5. A process for preparing a homogeneous, particulate polyolefin composite which comprises:
   (a) in-situ preparation of a catalytically active olefin-polymerizing filler compound according to claim 2; and
   (b) adding one or more alpha olefins to the catalytically active filler compound from step (a), under olefin polymerization conditions, in the presence of a co-catalyst comprising a trialkylaluminum compound.

6. A process for preparing a homogeneous, particulate polyolefin composite which comprises:
   (a) in-situ preparation of a catalytically active olefin-polymerizing filler compound according to claim 3; and
   (b) adding one or more alpha olefins to the catalytically active filler compound from step (a) under olefin polymerization conditions in the presence of a co-catalyst comprising a trialkylaluminum compound.

7. The process according to claim 4 wherein the alpha olefin is ethylene.

8. The process according to claim 5 wherein the alpha olefin is ethylene.

9. The process according to claim 6 wherein the alpha olefin is ethylene.

10. The process according to claim 4 wherein the co-catalyst is triisobutylaluminum.

11. The process according to claim 5 wherein the co-catalyst is triisobutylaluminum.

12. The process according to claim 6 wherein the co-catalyst is triisobutylaluminum.

13. The process according to claim 4 wherein the transtion metal compound is titanium tetrachloride or tetraneophylzirconium.

14. The process according to claim 5 wherein the transition metal compound is titanium tetrachloride or tetraneophylzirconium.

15. The process according to claim 6 wherein the transition metal compound is titanium tetrachloride or tetraneophylzirconium.

16. The process according to claim 1 wherein the azeotropic mixture boils in the temperature range of about 60° to about 98° C. at atmospheric pressure.

17. The process according to claim 16 wherein the azeotropic mixture boils in the temperature range of about 70° to 95° C., at atmospheric pressure.

18. The process according to claim 16 wherein the liquid alkane boils in the range of about 70° C. to about 190° C., at atmospheric pressure.

19. The process according to claim 18 wherein the liquid alkane boils in the range of about 90° to 170° C. at atmospheric pressure.

20. The process according to claim 18 wherein the liquid alkane has a boiling point below about 80° C. at atmospheric pressure and the azeotropic distillation is carried out at elevated pressure.

21. The process according to claim 2 wherein the acidifying compound is selected from phosphoric acid, sulfuric acid, silicon tetrachloride, aluminum trichloride, aluminum sulfate and aluminum alkoxide.

22. The process according to claim 21 wherein the acidifying compound is phosphoric acid.

23. The process according to claim 22 wherein the acidifying compound is dissolved in isopropanol.

24. The process according to claim 22 wherein the filler compound is calcium carbonate.

25. The process according to claim 1 wherein the liquid alkane is selected from n-octane, n-heptane, cyclohexane or a hydrocarbon mixture having a boiling point of about 165° C. at atmospheric pressure.

26. The process according to claim 2 wherein the liquid alkane is selected from n-octane, n-heptane, cyclohexane or a hydrocarbon mixture having a boiling point of about 165° C. at atmospheric pressure.

27. The process according to claim 3 wherein the liquid alkane is selected from n-octane, n-heptane, cyclohexane or a hydrocarbon mixture having a boiling point of about 165° C. at atmospheric pressure.

28. The process according to claim 4 wherein the liquid alkane is selected from n-octane, n-heptane, cyclohexane or a hydrocarbon mixture having a boiling point of about 165° C. at atmospheric pressure.

29. The process according to claim 5 wherein the liquid alkane is selected from n-octane, n-heptane, cyclohexane or a hydrocarbon mixture having a boiling point of about 165° C. at atmospheric pressure.

30. The process according to claim 6 wherein the liquid alkane is selected from n-octane, n-heptane, cyclohexane or a hydrocarbon mixture having a boiling point of about 165° C. at atmospheric pressure.

* * * * *